(12) United States Patent
van der Maas

(10) Patent No.: US 7,608,136 B2
(45) Date of Patent: Oct. 27, 2009

(54) IN-LINE FILTER WITH QUICK-CHANGE COUPLING AND A FILTER

(75) Inventor: Marinus Frans van der Maas, Arnemuiden (NL)

(73) Assignee: Scientific Glass Technology Singapore Pte Ltd., Singapore (SG)

(*) Notice: Subject to any disclaimer, the term of this patent is extended or adjusted under 35 U.S.C. 154(b) by 264 days.

(21) Appl. No.: 10/567,949

(22) PCT Filed: Aug. 11, 2004

(86) PCT No.: PCT/NL2004/000564

§ 371 (c)(1),
(2), (4) Date: Sep. 18, 2006

(87) PCT Pub. No.: WO2005/014143

PCT Pub. Date: Feb. 17, 2005

(65) Prior Publication Data

US 2007/0169446 A1      Jul. 26, 2007

(30) Foreign Application Priority Data

Aug. 11, 2003   (NL) .................................. 1024083

(51) Int. Cl.
*B01D 46/00*   (2006.01)
*F16L 37/28*   (2006.01)

(52) U.S. Cl. .................. 96/117.5; 55/504; 55/505; 55/417; 55/420; 96/106; 96/147; 96/417; 96/420; 137/614.05; 210/234; 251/149.1; 251/149.4; 251/149.6

(58) Field of Classification Search .................. 55/503, 55/505, 410, 418, 417, 420; 210/234, 235, 210/446; 96/106, 117.5, 147, 417, 420; 285/354, 285/399; 137/614.02, 614.05; 251/149, 251/149.1, 149.4, 149.6, 149.7

See application file for complete search history.

(56) References Cited

U.S. PATENT DOCUMENTS

| | | | | |
|---|---|---|---|---|
| 2,398,830 A | * | 4/1946 | Hamilton | 96/118 |
| 2,789,654 A | * | 4/1957 | Zurit | 96/148 |
| 4,357,237 A | * | 11/1982 | Sanderson | 210/222 |
| 4,483,368 A | | 11/1984 | Panthofer | |
| 4,966,550 A | * | 10/1990 | Privat | 433/25 |
| 5,194,233 A | | 3/1993 | Kitahara et al. | |
| 5,294,422 A | | 3/1994 | Kitahara et al. | |

(Continued)

FOREIGN PATENT DOCUMENTS

| | | |
|---|---|---|
| CN | 1419467 | 5/2003 |
| EP | 0 475 312 A | 3/1992 |
| WO | WO 01/64312 A1 | 9/2001 |

OTHER PUBLICATIONS

U.S. Appl. No. 60/185,991, filed Mar. 1, 2000, Stankowski et al.

*Primary Examiner*—Duane Smith
*Assistant Examiner*—Robert A Clemente
(74) *Attorney, Agent, or Firm*—Weingarten, Schurgrin, Gagnebin & Lebovici LLP

(57) ABSTRACT

An in-line filter provided with a substantially elongated filter housing (1; 51) in which filtering material (A) is included, the filter housing being provided on a first end with an inflow opening (2) and, on a second, opposite end with an outflow opening (3), while at the inflow opening (2) and the outflow opening (3) fastening means (4-7) are provided for fastening a supply or discharge tube, respectively (8 or 9, respectively), while the fastening means (4-7) are quick-change couplings (4-7), a respective quick-change coupling (4, 5; 6, 7) having a coupled condition and an uncoupled condition, while in the quick-change coupling (4, 5; 6, 7) a shut-off valve (10) is provided which, in the coupled condition, assumes an open position thus allowing gas to pass and which, in an uncoupled condition, assumes a closed position thus not allowing gas to pass.

29 Claims, 2 Drawing Sheets

U.S. PATENT DOCUMENTS

| | | |
|---|---|---|
| 5,320,752 A | 6/1994 | Clack et al. |
| 5,324,427 A * | 6/1994 | Traveset-Masanes et al. ............ 210/198.2 |
| 5,478,378 A * | 12/1995 | van der Maas et al. ........ 96/106 |
| 6,135,460 A | 10/2000 | Wise et al. |
| 6,149,718 A * | 11/2000 | Cowan et al. ............ 96/147 |
| 6,425,946 B1 * | 7/2002 | Funke et al. ............ 96/108 |
| 6,551,503 B2 * | 4/2003 | Niers et al. ............ 210/85 |
| 6,652,749 B2 * | 11/2003 | Stankowski et al. ........ 210/232 |
| 2001/0045386 A1 | 11/2001 | Wacks et al. |

* cited by examiner

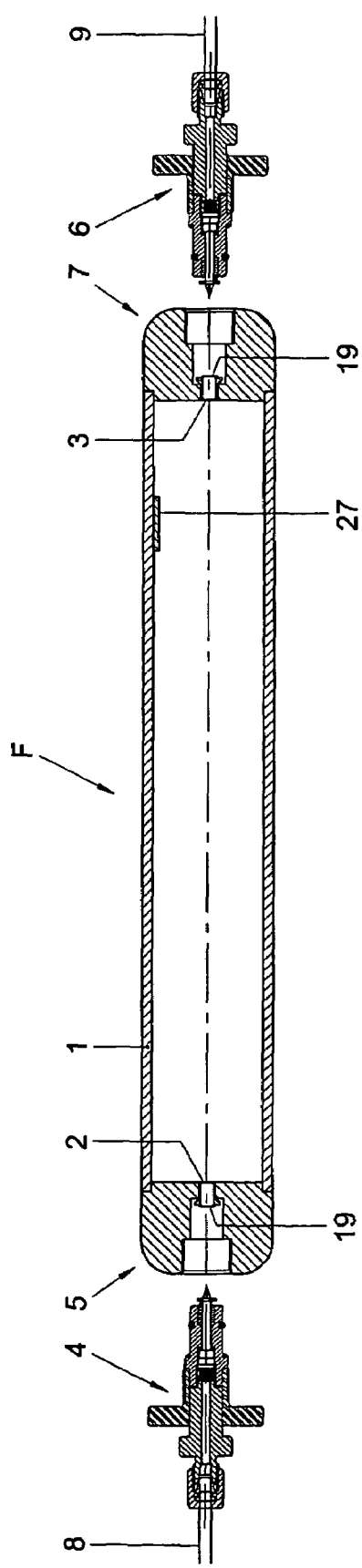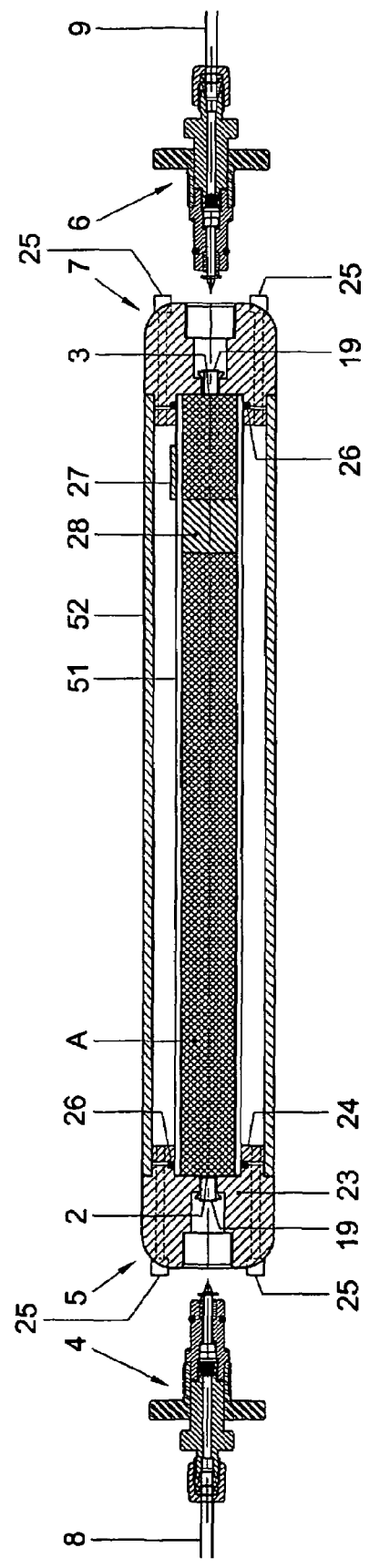

US 7,608,136 B2

IN-LINE FILTER WITH QUICK-CHANGE COUPLING AND A FILTER

This application is a §371 national phase filing of PCT/NL2004/000564 filed Aug. 11, 2004, and claims priority to a Dutch application No. NL 1024083 filed Aug. 11, 2003.

BACKGROUND OF THE INVENTION

The invention relates to an in-line filter provided with a substantially elongated filter housing in which filtering material is included, the filter housing being provided on a first end with an inflow opening and on a second, opposite end with an outflow opening, while at the inflow opening and the outflow opening fastening means are provided for fastening a supply or discharge tube, respectively.

Such filters have been known for years and are put into circulation by, inter alia, Supelco Inc. of Bellefonte, Pa., USA.

The drawback of these known filters is that the fastening means are designed as ferrule fittings, also indicated in commerce as Swagelok® fittings. When detaching the filter from the supply and discharge tube, the ferrule fittings are loosened and the supply and discharge tubes are in open communication with the atmosphere. This means that the tube system becomes polluted and that after changing the filter, rinsing with carrier gas such as, for instance, nitrogen is to take place for a long time, sometimes even a few hours in order to clean the tube system before a downstream process, such as, for instance, a detection process such as, for instance, gas chromatography, mass spectrography or an LCMS process can be put in fluid communication with the tube system again.

Another drawback of the known in-line filters is that, after coupling and uncoupling a number of times, the clamp fittings damage the supply and discharge tubes. The tube then needs to be shortened somewhat to allow an undamaged part thereof to be connected to the clamp fittings. It will be clear that this shortening is only possible a number of times and that after this, at least a partial replacement of the supply and/or discharge tube is required. In particular for the laboratory personnel having to perform these relatively technical operations, this is often an awkward, and in any way time-consuming task.

SUMMARY OF THE INVENTION

The object of the invention is an in-line filter for purifying high purity gasses (with a pollution of less than 10 ppm) without the drawbacks described hereinabove.

To this end, the invention provides an in-line filter of the type described in the opening paragraph, characterized in that the fastening means are quick-change couplings, the respective quick-change coupling having a coupled condition and an uncoupled condition while in the quick-change coupling a shut-off valve is provided which, in the coupled condition, assumes an opened position thus allowing gas to pass and which, in an uncoupled condition, assumes a closed position thus not allowing gas to pass.

An in-line filter with quick-change couplings has as a first advantage that it can be removed from the tube system without tools. Moreover, as the quick-change couplings need not be detached from the tube system, damage to the supply and discharge tube is prevented.

According to a further elaboration of the invention, the shut-off valve of the quick-change coupling can form part of a part of the quick-change coupling that remains connected to the supply or discharge tube, respectively, such that in the uncoupled condition the supply or discharge tube, respectively, are hardly, if at all, polluted by air.

An advantage of such a design is, that after removal of the in-line filter, the tube system does not become polluted as the respective shut-off valves in the quick-change couplings in the uncoupled condition assume a closed position in which they do not allow gas, and therefore air, to pass.

As a rule, the filtering material is intended, suitable and designed for removing water, oxygen or hydrocarbons from the gas to be purified, so that after having passed the filter, the pollutions in the gas to be purified are no more than 10 ppm.

The invention also provides a filter in which filtering material is present for removing water, oxygen and hydrocarbons from a gas flow, while the filtering material contains no alkali metals or alkaline earth metals. A filter which is provided with the filtering material IPX® meets those conditions. In the unlikely event of it bursting open, a filter without the alkali metals or alkaline earth metals mentioned will react less violently with moisture and oxygen and can therefore be transported without risks, this in contrast with the filtering materials often used heretofore.

BRIEF DESCRIPTION OF THE DRAWINGS

Further elaborations of the invention are described in the subclaims and will be further clarified in and by an exemplary embodiment, with reference to the drawing. In the drawing:

FIG. 1 shows a cross-section of a first exemplary embodiment;

FIG. 2 shows a similar cross-section as represented in FIG. 1 of a second exemplary embodiment.

DETAILED DESCRIPTION OF THE INVENTION

Figure 3:
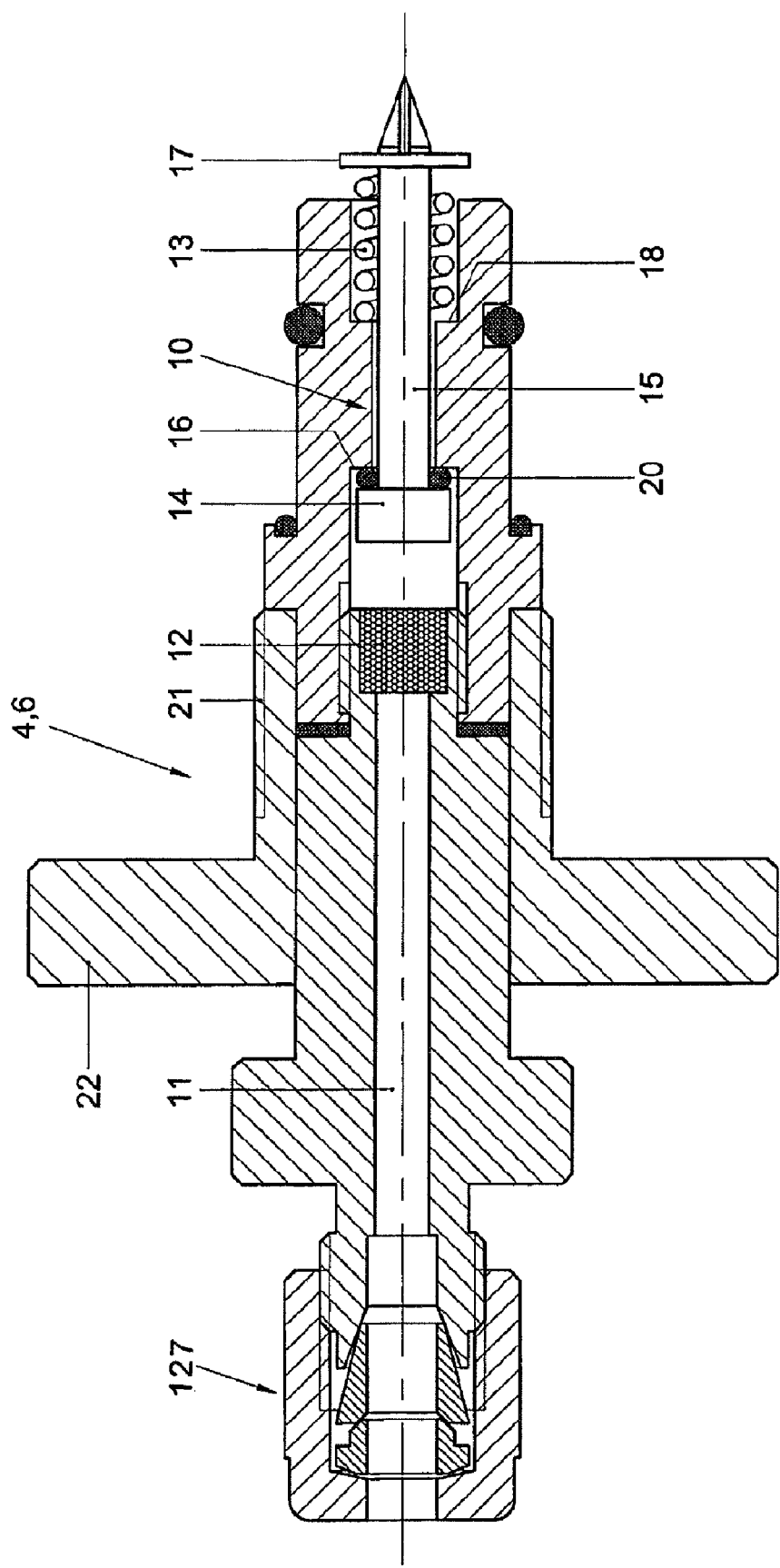
FIG. 3 shows in detail the male part of the quick-change coupling which is used in the exemplary embodiments represented in FIGS. 1 and 2.

The exemplary embodiments of an inline filter F according to the invention represented in the FIGS. are provided with a substantially elongated filter housing 1 (FIG. 1) and 51 (FIG. 2) in which filtering material A can be included. On a first end, the filter housing 1, 51 is provided with an inflow opening 2 and on a second, opposite end with an outflow opening 3. At the inflow opening 2 and the outflow opening 3, fastening means 4, 5, 6, 7 are provided for fastening a supply or a discharge tube 8, or 9, respectively. The fastening means are quickchange couplings 4, 5; 6, 7 have a coupled condition and an uncoupled condition. In the quickchange coupling, a shut-off valve 10 (see FIG. 3) is provided which, in the coupled condition, assumes an opened position and thus allows gas to pass and which, in an uncoupled condition, assumes a closed position and thus does not allow gas to pass. The shutoff valve 10 of the quickchange coupling 4, 5; 6, 7 forms part of the part 4, 6 of the quickchange coupling, 4, 5, 6, 7 that remains connected to the supply or discharge tube, 8 or 9, respectively, such that in the uncoupled condition the supply or discharge tube, 8 or 9, respectively, is hardly, if at all, polluted by air. Each quickchange coupling 4, 5; 6, 7 comprises a male part 4, 6 and a female part 5, 7 through which a bore 11 (see FIG. 3) extends, which forms the fluid communication between the supply or discharge tube, 8 or 9, respectively, and the inflow opening 2 or outflow opening 3, respectively, of the filter housing 1, 51. With the male part 4 or 6, respectively, and the female part 5 or 7, respectively, in coupled condition, the quick-change coupling 4-7 is in the coupled condition and the shutoff valve 10 is opened. With the male part 4, 6 and the female part 5, 7 in an uncoupled condition, the quick-change coupling 4-7 is in the uncoupled condition and the shut-off valve 10 is closed.

The male parts 4, 6 of the two quick-change couplings 4-7 are connected to the supply or discharge tube 8 or 9, respectively. The female parts 5, 7 are connected to the two ends of the filter housing 1, 51.

In the bore 11 in the male part 4, 6, a sieve 12 is included.

Each male part 4, 6 is provided with a clamp fitting 27 for connecting the male parts 4, 6 to the supply tube 8 and the discharge tube 9, respectively.

At each quick-change coupling 4-7, the shut-off valve 10 is included in the bore 11 in the male part 4, 6. The shut-off valve 10 is biased in a closed position by a spring 13. The shut-off valve 10 comprises a valve body 14 and a valve stem 15. The valve body 14 is designed to cooperate with a valve seat 16 in the bore 11 of the male part 4, 6. The valve stem 15 is provided with a collar 17 against which the spring 13 rests with a first end. Another end of the spring 13 bears against a supporting surface 18 provided in the male part 4, 6 in that a constriction is provided in the bore 11. When the male part 4, 6 is placed in the female part 5, 7, the valve stem, with an end facing away from the valve body 14, meets a stop 19 in the female part 5, 7 such that movement against a spring force of spring 13 in the valve of body 14 of the valve seat is effected. Between the valve body 14 and the valve seat 16, a flexible sealing ring 20 is provided.

The stop 19 in the female part comprises a Teflon cap, which, when the male part 4, 6 is placed in the female part 5, 7, is pierced by the free end of the valve stem 15 provided to that end with a sharp point.

With the aid of screw thread 21, the male part 4, 6 can be connected to the female part 5, 7. In the exemplary embodiments shown, the screw thread 21 on the male part 4, 6 is provided on an fastening ring 22 rotatably connected with the male part 4, 6 such that only the ring 22 needs to be turned for fastening the male part 4, 6 in the female part 5, 7. Therefore, the remaining parts of the male part 4, 6 need not be rotated.

In the first exemplary embodiment of FIG. 1, the connection between the female part 5, 7 and a filter housing 1 is formed by a press fit joint or a glued joint. In the second exemplary embodiment of FIG. 2, the connection between the filter housing 51 and the female part 5, 7 is formed by a detachable connection, more in particular by a clamp joint, to which end the female part 5, 7 is provided with a body 23 and a clamping plate 24 which can be connected to the body 23 with the aid of fastening bolts 25. Further, a flexible clamping ring 26 is provided with a diameter that fits the outer circumference of the filter housing 51. By compressing the flexible clamping ring 26 between the body 23 and the clamping plate 24 with the aid of the fastening bolts 25, the clamping ring 26 is deformed and through the clamping ring 26, the filter housing 51 is forcefully connected to the female part 5, 7. In the exemplary embodiment of FIG. 2, around the filter housing 51 a protective shell 52 is provided. The protective shell 52 is included between the two female parts 5, 7.

Optionally, the filter housing 1; 51 and the optional protective shell 52 can be at least partly transparent, for instance in that the filter housing 1; 51 is manufactured from glass and in that the protective shell 52 is manufactured from acrylic plastic. In the filter housing 1; 51 an indicator 28 can be included, which discolors when the filtering material A is saturated. In this manner, the operator knows when the filter needs to be replaced.

In order to retrieve the data of the various in-line filters in a gas system in a simple manner, in each of its in-line filters a transponder 27 can be included. The transponders 27 can be read out remotely. Thus, in a simple manner, it can be determined how long a particular filter has been in use already or whether it requires replacing. When, during evaluation of those data in a control also the amount of flown-through gas is included, the use of indicators in the filters can be dispensed with. The fact is that when the remaining life span is monitored, the system can warn the user when the filter needs to be replaced. For reading out the transponder, the operator can utilize a receiver for reading out a transponder of in-line filter. Naturally, reading out can all so take place automatically. The advantages of such provisions are that the status of the various filters in a gas system can be determined in an automatic manner. The fact is that when the receivers for reading out the transponders of the different in-line filters are connected to a central processing unit, the period of use and, optionally, the remaining standing time of the various filters can be monitored in a simple manner. The system can for instance warn the user that new filters are to be ordered or the system itself can place the order automatically before the end of the life span of the filter is reached. The transponder 27 and the receiver can also be used to verify whether the correct filter has been placed. Optionally, the transponder 27 can be provided with a temperature sensor. When the temperature of a filtering material rises, this usually means that a reaction takes place, which means that the filtering material A at that location becomes saturated. Therefore, when the transponder 27 with temperature sensor is provided adjacent the downstream end of the filter housing 1; 51, it can be determined whether the filter F is on the brink of bursting. In that case, the transponder 27 serves as an indicator and the housing of the filter F needs no longer be designed so as to be transparent and can be manufactured from, for instance, metal. The transponder 27 can also be used for storing historical user data of the respective in-line filter F. Duration of use, flow measurements and/or temperature measurements can for instance be stored in the memory of the transponder 27. From such data, a remaining life span can be derived in a simple manner.

With the aid of the clamp fittings 127, the male parts 4, 6 are connected once to the supply or discharge tube 8 or 9, respectively. Then, the inline filter F can be included in the tube system through connection of the male parts 4, 6 to female parts 5, 7 of the inline filter F. This is effected by manually screwing the fastening ring 22 provided with outer thread in the female part 5, 7. With it, the male parts 4, 6 are pressed tight in the female parts 5, 7. Also, the shutoff valve 10 is opened in that the point of the valve stem 15 meets the Teflon sealing cap 19 also serving as a stop. Moreover, the valve stem 15 pierces the Teflon cap such that the filtering material is put in fluid communication with the supply and discharge tube 8, 9. Upon detachment, the fastening ring 22 is loosened again. When, thereupon, the male parts 4, 6 are removed from the female parts 5,7, the shutoff valve 10 will be brought back into the closed position under the influence of the spring 13 so that no open communication between the atmosphere and the tube system is formed. As a result thereof, after changing the filter F, extensive rinsing is not necessary.

The filtering material A in the filter housing can be, for instance, nanochem® or IPX®. An additional advantage of IPX®, which is marketed by Matheson-Trigas, is that it contains no alkali metals or alkaline earth metals. Such alkali metals or alkaline earth metals, which are much used in conventional filtering material, are reactive with oxygen and/or moisture to such an extent that transport of such substances is not without risks, especially when transport by aeroplane is concerned. Consequently, according to the invention, a filter is provided in which filtering material is present for removing water, oxygen and hydrocarbons from a gas flow, while the filtering material contains no alkali metals or alkaline earth metals. A filter provided with filtering material IPX® meets those conditions and can therefore be transported without risks.

What I claim is:

1. An in-line filter provided with a transponder and a substantially elongated filter housing in which filtering material is included, the filter housing being provided on a first end with an inflow opening and on a second, opposite end with an outflow opening, while at the inflow opening and the outflow opening fastening means are provided for fastening a supply or discharge tube, respectively, wherein the fastening means are quick-change couplings, a respective quick-change coupling having a coupled condition and an uncoupled condition, while in the quick-change coupling a shut-off valve is provided which, in the coupled condition, assumes an open position and thus allows gas to pass and which, in an uncoupled condition, assumes a closed position and thus does not allow gas to pass;

wherein each quick-change coupling comprises a male part and a female part through which a bore extends, which forms the fluid communication between the supply or discharge tube, respectively, and the inflow opening or outflow opening, respectively, of the filter housing, while, with the male part and the female part in coupled condition, the quick-change coupling is in the coupled condition and with the male part and the female part in uncoupled condition, the quick-change coupling is in the uncoupled condition; and wherein the shut-off valve is disposed in the bore of the male part; is biased in a closed position by a spring; and comprises a valve body and a valve stem, the valve body being arranged for cooperation with a valve seat in the bore of the male part, the valve stem being provided with a collar against which the spring rests with a first end, while another end of the spring rests against a supporting surface provided in the male part, as a constriction is provided in the bore, while, when the male part is placed in the female part, with an end facing away from the valve body, the valve stem meets a stop in the female part such that movement against the spring force of the spring is effected.

2. An in-line filter according to claim 1, wherein the shut-off valve of the quick-change coupling forms part of the part of the quick-change coupling that remains connected to the supply or discharge tube, respectively, such that in the uncoupled condition, the supply or discharge tube, respectively is hardly, if at all, polluted by air.

3. An in-line filter according to claim 2, wherein each quick-change coupling comprises a male part and a female part through which a bore extends, which forms the fluid communication between the supply or discharge tube, respectively and the inflow opening or outflow opening respectively, of the filter housing, while, with the male part and the female part in coupled condition, the quick-change coupling is in the coupled condition and with the male part and the female part in uncoupled condition, the quick-change coupling is in the uncoupled condition.

4. An in-line filter according to claim 3, wherein the female parts are connected to the two ends of the filter housing.

5. An in-line filter according to claim 1, wherein the male parts of the two quick-change couplings are connected to the supply or discharge tube, respectively.

6. An in-line filter according to claim 1, wherein a first female part, which forms the fluid communication between the supply tube and the inflow opening, and a second female part, which forms the fluid communication between the dispensing tube and the outflow opening, are connected to the two ends of the filter housing.

7. An in-line filter according to claim 1, wherein in the bore in the male part a sieve is included.

8. An in-line filter according to claim 1, wherein each male part is provided with a clamp fitting for connecting the male parts to the supply tube and the discharge tube, respectively.

9. An in-line filter according to claim 1, wherein the stop in the female part comprises a poly(tetrafluoroethylene) or poly(tetrafluoroethene) (PTFE) cap which cap, when the male part is placed in the female part, is pierced by the free end of the valve stem provided to that end with a sharp point.

10. An in-line filter according to claim 1, wherein around the filter housing a protective shell is provided.

11. An in-line filter according to claim 10, wherein the protective shell is included between two female parts.

12. An in-line filter according to claim 10, wherein at least one of the filter housing and the protective shell are at least partly transparent, for instance in that the filter housing is manufactured from glass and in that the protective shell is manufactured from acrylic plastic, while in the filter housing an indicator is included which discolors when the filtering material is saturated.

13. An in-line filter according to claim 10, wherein the protective shell is included between the two female parts.

14. An in-line filter according to claim 1, wherein the transponder is provided with a temperature sensor, while the transponder is placed on the filter housing adjacent a downstream end of the filter housing.

15. The in-line filter according to claim 1, the filtering material being configured to remove water, oxygen and hydrocarbons from a gas flow, while the filtering material does not contain alkali metals or alkaline earth metals.

16. The in-line filter as recited in claim 1, wherein the bore in the male part includes a sieve.

17. The in-line filter according to claim 16, the filtering material being configured to remove water, oxygen and hydrocarbons from a gas flow, while the filtering material does not contain alkali metals or alkaline earth metals.

18. The in-line filter as recited in claim 1, wherein the male part is provided with a clamp fitting for connecting to at least one of the supply tube and the discharge tube.

19. The in-line filter according to claim 18, the filtering material being configured to remove water, oxygen and hydrocarbons from a gas flow, while the filtering material does not contain alkali metals or alkaline earth metals.

20. An in-line filter provided with a transponder and a substantially elongated filter housing in which filtering material is included, the filter housing being provided on a first end with an inflow opening and on a second, opposite end with an outflow opening, while at the inflow opening and the outflow opening fastening means are provided for fastening a supply or discharge tube, respectively, wherein the fastening means are quick-change couplings, a respective quick-change coupling having a coupled condition and an uncoupled condition, while in the quick-change coupling a shut-off valve is provided which, in the coupled condition, assumes an open position and thus allows gas to pass and which, in an uncoupled condition, assumes a closed position and thus does not allow gas to pass; and wherein each quick-change coupling comprises a male part and a female part through which a bore extends, which forms the fluid communication between the supply or discharge tube, respectively, and the inflow opening or outflow opening, respectively, of the filter housing, while, with the male part and the female part in coupled condition, the quick-change coupling is in the coupled condition and with the male part and the female part in uncoupled condition, the quick-change coupling is in the uncoupled condition; and wherein a screw thread on the male part for connecting the male part to the female part, is provided on a fastening ring rotatably connected to the male part of such that only the fastening ring needs to be turned for fastening the male part in the female part and that therefore the remaining parts of the male part need not be rotated.

21. An in-line filter provided with a transponder and a substantially elongated filter housing in which filtering material is included, the filter housing being provided on a first end with an inflow opening and on a second, opposite end with an outflow opening, while at the inflow opening and the outflow opening fastening means are provided for fastening a supply or discharge tube, respectively, wherein the fastening means are quick-change couplings, a respective quick-change coupling having a coupled condition and an uncoupled condition, while in the quick-change coupling a shut-off valve is provided which, in the coupled condition, assumes an open position and thus allows gas to pass and which, in an uncoupled condition, assumes a closed position and thus does not allow gas to pass; and wherein each quick-change coupling comprises a male part and a female part through which a bore extends, which forms the fluid communication between the supply or discharge tube, respectively, and the inflow opening or outflow opening, respectively, of the filter housing, while, with the male part and the female part in coupled condition, the quick-change coupling is in the coupled condition and with the male part and the female part in uncoupled condition, the quick-change coupling is in the uncoupled condition; and wherein a connection between the female part and the filter housing is formed by a detachable connection that is formed by a clamp joint, to which end the female part is provided with a body, a clamping plate which can be connected to the body with the aid of fastening bolts and with a flexible clamping ring with a diameter that fits the outer circumference of the filter housing.

22. An in-line filter provided with a substantially elongated filter housing in which filtering material is included, the filter housing being provided on a first end with an inflow opening and on a second, opposite end with an outflow opening, while at the inflow opening and the outflow opening fastening means are provided for fastening a supply or discharge tube, respectively, wherein the fastening means are quick-change couplings, a respective quick-change coupling having a coupled condition and an uncoupled condition, while in the quick-change coupling a shut-off valve is provided which, in the coupled condition, assumes an open position and thus allows gas to pass and which, in an uncoupled condition, assumes a closed position and thus does not allow gas to pass, wherein each quick-change coupling comprises a male part and a female part through which a bore extends, which forms the fluid communication between the supply or discharge tube, respectively and the inflow opening or outflow opening respectively, of the filter housing, while, with the male part and the female part in coupled condition, the quick-change coupling is in the coupled condition and with the male part and the female part in uncoupled condition, the quick-change coupling is in the uncoupled condition, wherein at each quick-change coupling, the shut-off valve that is biased in a closed position by a spring is included in the bore in the male part, and wherein the shut-off valve comprises a valve body and a valve stem, the valve body being arranged for cooperation with a valve seat in the bore of the male part, the valve stem being provided with a collar against which the spring rests with a first end, while another end of the spring rests against a supporting surface provided in the male part, as a constriction is provided in the bore, while, when the male part is placed in the female part, with an end facing away from the valve body, the valve stem meets a stop in the female part such that movement against the spring force of the spring is effected.

23. The in-line filter according to claim 22, the filtering material being configured to remove water, oxygen and hydrocarbons from a gas flow, while the filtering material does not contain alkali metals or alkaline earth metals.

24. An in-line filter according to claim 22, wherein between the valve body and the valve seat a flexible sealing ring is provided.

25. An in-line filter according to claim 24, wherein the stop in the female part comprises a poly(tetrafluoroethylene) or poly(tetrafluoroethene) (PTFE) cap which cap, when the male part is placed in the female part, is pierced by the free end of the valve stem provided to that end with a sharp point.

26. An in-line filter provided with a substantially elongated filter housing in which filtering material is included, the filter housing being provided on a first end with an inflow opening and on a second, opposite end with an outflow opening, while at the inflow opening and the outflow opening fastening means are provided for fastening a supply or discharge tube, respectively, wherein the fastening means are quick-change couplings, a respective quick-change coupling having a coupled condition and an uncoupled condition, while in the quick-change coupling a shut-off valve is provided which, in the coupled condition, assumes an open position and thus allows gas to pass and which, in an uncoupled condition, assumes a closed position and thus does not allow gas to pass, wherein each quick-change coupling comprises a male part and a female part through which a bore extends, which forms the fluid communication between the supply or discharge tube, respectively and the inflow opening or outflow opening respectively, of the filter housing, while, with the male part and the female part in coupled condition, the quick-change coupling is in the coupled condition and with the male part and the female part in uncoupled condition, the quick-change coupling is in the uncoupled condition, and, with the aid of screw thread, the male part can be connected to the female part, wherein screw thread on the male part is provided on a fastening ring rotatably connected to the male part of such that only the fastening ring needs to be turned for fastening the male part in the female part and that therefore the remaining parts of the male part need not be rotated.

27. The in-line filter according to claim 26, the filtering material being configured to remove water, oxygen and hydrocarbons from a gas flow, while the filtering material does not contain alkali metals or alkaline earth metals.

28. An in-line filter provided with a substantially elongated filter housing in which filtering material is included, the filter housing being provided on a first end with an inflow opening and on a second, opposite end with an outflow opening, while at the inflow opening and the outflow opening fastening means are provided for fastening a supply or discharge tube, respectively, wherein the fastening means are quick-change couplings, a respective quick-change coupling having a coupled condition and an uncoupled condition, while in the quick-change coupling a shut-off valve is provided which, in the coupled condition, assumes an open position and thus allows gas to pass and which, in an uncoupled condition, assumes a closed position and thus does not allow gas to pass,
   wherein each quick-change coupling comprises a male part and a female part through which a bore extends, which forms the fluid communication between the supply or discharge tube, respectively and the inflow opening or outflow opening respectively, of the filter housing, while, with the male part and the female part in coupled condition, the quick-change coupling is in the coupled condition and with the male part and the female part in uncoupled condition, the quick-change coupling is in the uncoupled condition,
   wherein the connection between the female part and the filter housing is formed by a detachable connection, and wherein the connection is formed by a clamp joint, to which end the female part is provided with a body, a clamping plate which can be connected to the body with the aid of fastening bolts and with a flexible clamping ring with a diameter that fits the outer circumference of the filter housing.

29. The in-line filter according to claim 28, the filtering material being configured to remove water, oxygen and hydrocarbons from a gas flow, while the filtering material does not contain alkali metals or alkaline earth metals.

* * * * *

UNITED STATES PATENT AND TRADEMARK OFFICE
CERTIFICATE OF CORRECTION

| | | |
|---|---|---|
| PATENT NO. | : 7,608,136 B2 | Page 1 of 1 |
| APPLICATION NO. | : 10/567949 | |
| DATED | : October 27, 2009 | |
| INVENTOR(S) | : Marinus Frans van der Maas | |

It is certified that error appears in the above-identified patent and that said Letters Patent is hereby corrected as shown below:

Title Page, should read (*) Notice: Subject to any disclaimers, the term of this patent is extended or adjusted under 35 U.S.C. 154 (b) by 520 days.

Title page, Item (74) Attorney, Agent or Firm, "Schurgrin" should read --Schurgin--;

Column 2, line 47, "quickchange" should read --quick-change--;

Column 2, line 48, "quickchange" should read --quick-change--;

Column 2, line 52, "shutoff" should read --shut-off--;

Column 2, line 53, "quickchange" should read --quick-change--;

Column 2, line 54, "quickchange" should read --quick-change--;

Column 2, line 58, "quickchange" should read --quick-change--;

Column 2, line 66, "shutoff" should read --shut-off--;

Column 4, line 40, "inline" should read --in-line--;

Column 4, line 42, "inline" should read --in-line--;

Column 4, line 45, "shutoff" should read --shut-off--; and

Column 4, line 52, "shutoff" should read --shut-off--.

Signed and Sealed this

Thirty-first Day of August, 2010

David J. Kappos
*Director of the United States Patent and Trademark Office*